UNITED STATES PATENT OFFICE.

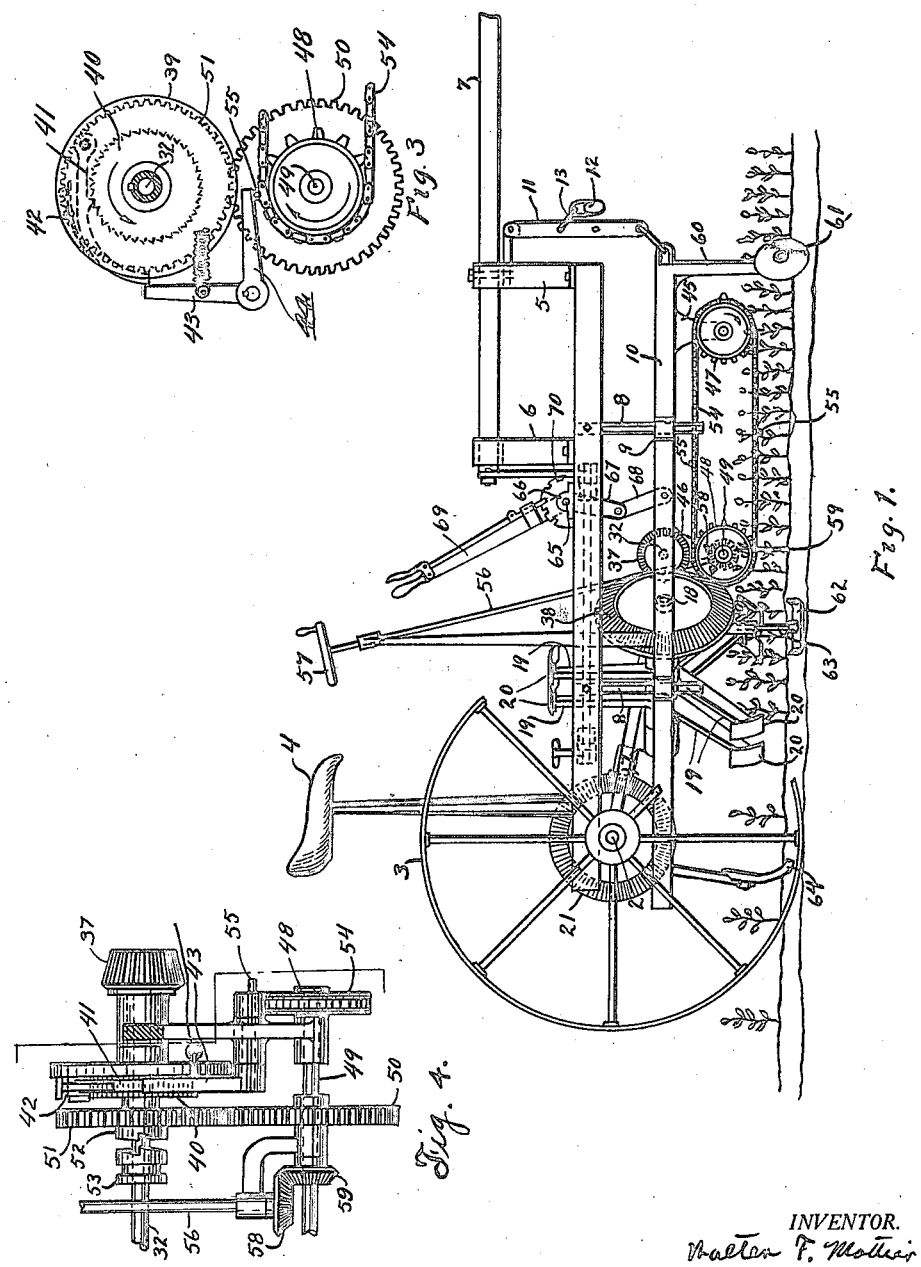

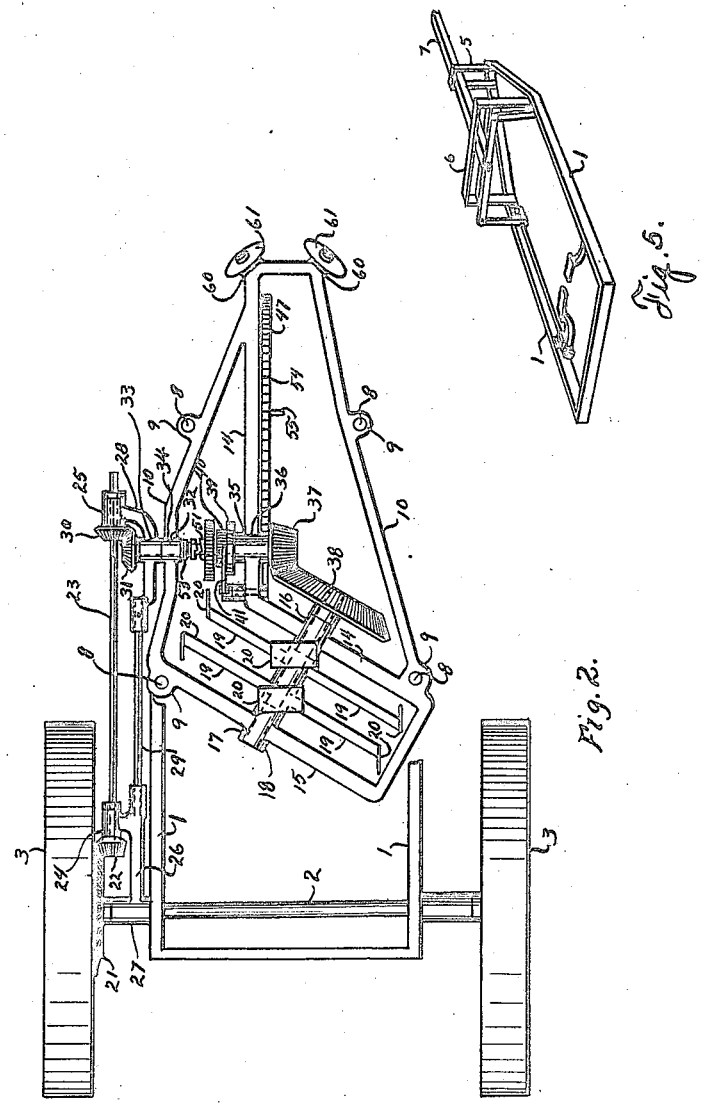

WALTER F. MOTTIER, OF EL CAMPO, TEXAS.

COTTON CHOPPER.

1,425,035.   Specification of Letters Patent.   Patented Aug. 8, 1922.

Application filed April 22, 1920. Serial No. 375,882.

*To all whom it may concern:*

Be it known that I, WALTER F. MOTTIER, citizen of the United States, residing at El Campo, in the county of Wharton and State of Texas, have invented a certain new and useful Improvement in a Cotton Chopper, of which the following is a specification.

This invention relates to new and useful improvements in a cotton chopper.

One object of the invention is to provide a machine of the character described which has been specially constructed for the purpose of chopping out rows of cotton or other plants so that the plants in the row will be thinned out, leaving only those which are to be permitted to grow; and the particular object of the invention is to provide a chopper which may be so controlled by the operator that certain selected plants will be left in the row and the others chopped out. In the cultivation of cotton and many other plants as a rule too many seeds are planted so that when the plants come up some of them must be cut out, so as to leave only the required number in each row and it is often desirable where the plants are not uniform, to cut out the smaller plants and leave the larger ones. It is the object of this invention to provide a chopper whereby the larger plants may be selected and left standing and the other ones cut out of the row.

Another object of the invention is to provide a cotton chopper of the character described, whose selective mechanism may be clutched with the driving mechanism of the machine and driven uniformly, independent of the control of the operator, to cut out certain plants and to leave others standing. This will be the case where the plants in the row are substantially uniform and it is not desired to select some particular plants and chop out the others.

Another object of the invention is to provide, in a cotton chopper, an improved form of hoe which will operate on opposite sides of the plants left in the row.

A further feature of the invention is to provide side runners which travel along on opposite sides of the row and regulate the cutting of the hoes to a uniform depth.

With the above and other objects in view the invention has particular relation to certain novel features of construction, operation and arrangement of parts, an example of which is given in this specification and illustrated in the accompanying drawings wherein:

Figure 1 is a side elevation of the machine.

Figure 2 shows a plan view with certain parts broken away for the sake of clearness.

Figure 3 is an enlarged fragmentary side view of the hoe controlling mechanism.

Figure 4 shows a rear view thereof and

Figure 5 shows a perspective view of the main frame.

Referring now more particularly to the drawings wherein like numerals of reference designate similar parts in each of the figures, the numerals 1, 1 designate the side members of the main frame, which is supported upon the arched axle 2. This axle is supported by the ground wheels 3, 3. The main frame has the driver seat 4 near its rear end and at its forward end its side members are connected by the transverse arches 5, and 6. A draft tongue 7 is pivoted to the arch 5 and its rear end plays through a suitable bearing formed in the arch 6.

Each of the side members 1 has the depending bearing rods 8, 8 which extend through corresponding bearings 9, 9 formed in the side members 10, 10 of an auxiliary frame work which is arranged underneath the main frame and whose side members converge forwardly as shown in Figure 2.

A depending draft bar 11 is fastened at its upper end to the arch 5 and is linked at its lower end to the front end of the auxiliary frame work. A double tree 12 is attached to this draft bar by means of a clevis 13 and is provided for the attachment of the draft animals to the machine. The auxiliary frame work has the diagonally extending front and rear bearing races 14 and 15, the former of which is turned forwardly and secured to the front end of the auxiliary frame work. These braces have the respective bearings 16 and 17 arranged in alignment in which the respective ends of the hoe shaft 18 rotate. Fixed to this shaft are the radiating arms 19, 19 arranged in pairs and spaced apart. A single pair of these arms may be employed, or a plurality of pairs, as shown. The outer ends of the arms carry the hoes 20, 20 which are also spaced apart and are designed to cut on opposite sides of the plants left in the row.

One of the ground wheels 3 has a beveled gear wheel 21 fixed to the inside thereof, which is in mesh with and drives the pinion 23. This pinion is fixed upon the rear end of the lengthwise shaft 23 which rotates in suitable bearings 24, 25. The bearing 24 is fastened to a swinging arm 26 whose rear end is formed into a bearing 27 which operates on the corresponding end of the axle 2. The bearing 25 is formed on the forward end of the bracket 28 and the swinging arm 26 and the bracket 28 are secured in fixed relation by means of the connecting rod 29 which is secured at its respective ends to said arm and bracket. The forward end of the shaft 33 has a beveled pinion 30 which is in mesh with a corresponding pinion 31 fixed on the outer end of the transverse shaft 32. This last mentioned shaft is rotatable in the aligned bearings 33 and 34, carried respectively by the bracket 28 and the adjacent side member 10. A sleeve 35 is mounted in a bearing 38 carried by the forwardly extending portion of the brace 14. This sleeve is aligned with the bearings 33 and 34 and the inner end of the shaft 32 extends through it. The inner end of the sleeve 35 is formed with a beveled pinion 37 which is in mesh with a beveled gear wheel 38 which is fixed upon the front end of the hoe shaft 19. The opposite end of the sleeve 35 is formed into a disc 39 and adjacent said disc there is a ratchet wheel 40 which is fixed on the shaft 32. A dog 41 is pivoted to the face of the disc 39 and is normally held in engagement with the ratchet 40 by means of the pressure spring 42 and when in engagement this dog will force the disc 39 and the sleeve 35 to rotate with the shaft 32 and this rotation will be transmitted through the pinion 37 to the beveled gear wheel 38 and to the hoe shaft 18 and the hoes carried thereby. A release lever 43 is pivoted to the auxiliary frame and its upper free end is arranged to normally contact against the downwardly curved free end of the dog 41 to hold said dog disengaged from the ratchet 40. The lever 43 has a laterally extending release arm 44 through which said lever may be released from said dog through the mechanism hereinafter described.

Depending from the auxiliary frame work are the front and rear bearing members 45 and 46. Rotatably mounted on the front bearing member is a sprocket wheel 47 which is aligned with a corresponding sprocket wheel 48 which is fixed on the transverse shaft 49. This last mentioned shaft is rotatable in a long bearing carried by the rear bearing member 46 and has a spur gear wheel 50 fixed thereon which is in mesh with a corresponding spur gear wheel 51 which is loosely mounted on the shaft 32. The outer side of this last mentioned gear wheel is formed with a clutch member 52 and the shaft 32 has an opposing clutch member 53 splined thereon and adapted to be engaged with and disengaged from the clutch member 52 through a suitable lever (not shown) but of the usual construction. Operating over the sprocket wheels 47 and 48 there is a sprocket chain 54 which is provided with a plurality of outwardly projecting lugs 55 spaced a uniform distance apart. This chain travels in the direction indicated by the arrows in Figures 1 and 3 and the lugs successively contact with the free end of the arm 44 and lift said arm and thereby disengage the lever 43 from the dog 41, releasing said dog to the influence of the spring 42 which causes it to engage with the ratchet wheel 40. When so engaged the disc 39 and the sleeve carrying the same are forced to rotate with said ratchet wheel. Meanwhile the lug having passed the free end of the arm 44, said arm drops down by gravity carrying the free end of the lever 43 into the path of the free end of the dog 41 and upon the performance of one rotation by the disc 39, said dog is thereby disengaged from the ratchet wheel and the rotation of the sleeve 35 is stopped. The gear ratio between the pinion 37 and the bevel gear 38 is such as to cause a single rotation of said pinion to cause a partial rotation of said bevel gear wheel which in turn will carry a pair of the hoes 20 across the row thus chopping out some of the plants, but permitting the plant between said hoes to stand. When the next succeeding lug contacts with the arm 44 the operation will be repeated, the machine meanwhile moving forwardly along the row so that the plants will be chopped from the row uniformly and those left standing will be a uniform distance apart.

Depending from the forward end of the auxiliary frame work are the disc supports 60, 60 arranged on opposite sides of the row and whose lower ends carry the discs 61, 61 which pass along on opposite sides of the row and form shallow furrows or tracks along which the runners 62 may travel. These runners are preferably formed of metallic plates having upturned ends and are secured to the lower ends of the supporting legs 63 which are fastened to and depend from the side members 10, 10 of the auxiliary frame work. These runners hold said frame work at a uniform distance above the ground and consequently regulate the depth at which the hoes cut.

It is to be observed that the hoe shaft 19 extends diagonally with relation to the movement of the machines along the row. The result is that during the working stroke of the hoes they travel rearwardly relative to the machine, but this rearward movement of the hoes relative to the machine, is compensated for, or offset by the simultaneous forward movement of the machine so that the hoes, during working stroke, strike across the row at substantially right angles thereto.

Following the hoes there are suitable cultivators as 64 arranged on each side of the row and depending from the rear end of the auxiliary frame work.

In turning around and in moving from place to place it is desirable that the auxiliary frame work be elevated relative to the main frame so that its appendants will not come in contact with the ground. For this purpose I have mounted a transverse shaft 65 in suitable bearings 66 carried by the side members 1, 1 of the main frame. Each end of this shaft has a depending arm 67 fixed thereto, whose free end is pivoted to the upper end of a link 68 and the lower end of this link is pivoted to the corresponding side member 10 of the auxiliary frame work. The shaft 65 has a manual lever 69 fixed thereto through which said shaft may be rotated and the auxiliary frame work thus raised or lowered and said lever may be locked in any desired position through the instrumentality of a rack-and-dog mechanism 70 of well known construction.

It is to be understood that this operation takes place while the clutch members 52 and 53 are engaged and a constant uniform rotation is being imparted through the shaft 32 and the gear wheels 51 and 50 to the shaft 49 and the sprocket wheel 48 carried thereby.

The hoes however may be controlled normally by the operator so that they may be made to chop out the plants desired and leave those selected by the operator. This result is accomplished through the mechanism of a manually controlled device which will now be described:—

The numeral 56 designates a shaft which is rotatably mounted in suitable bearings and the upper end of which carries the hand wheel 57 within easy reach of the operator and through which said shaft may be rotated. The lower end of this shaft carries a beveled pinion 58 which is in mesh with a beveled gear wheel 59 carried on the adjacent end of the shaft 49. When the chopping mechanism is to be controlled by the operator, the clutch 53 is disengaged and as the machine travels along the row where the stalks are not uniform and the operator desires to select and leave certain stalks and chop out the others, he will rotate the hand wheel 57 to bring one of the lugs 55 opposite the selected stalk and will then rotate said hand wheel in unison with the machine as the machine moves forwardly to hold said lug stationary with respect to and opposite the stalk selected until it reaches and trips the arm 44. This will set the chopping mechanism in operation as above explained and the gearing is such that the hoes will pass across the row on opposite sides of the stalk selected thus leaving it standing and chopping out the others and this operation may be continued by the operator so long as the plants are thin or irregular in size or location and when the plants become uniform in the row the clutch members 52 and 53 may be again engaged which will result in the normal and uniform operation of the hoes.

What I claim is:

1. A device of the character described including a framework, ground wheels, runners depending from the framework and provided to move along the ground surface on opposite sides of a row of plants, furrow forming members depending from the framework in advance of said runners and provided to form furrows along which the runners may travel and a hoe mounted on the framework and movable transversely with respect to said row.

2. A device of the character described including a framework, ground wheels, runners depending from the framework and provided to move along the ground surface on opposite sides of a row of plants, furrow forming members depending from the framework in advance of said runners and provided to form furrows along which the runners may travel and a hoe mounted on the framework and movable transversely with respect to said row and means operatively connected with one ground wheel and the hoe and driving the latter from the former.

3. A device of the character described including a framework, ground wheels, a hoe mounted on the framework to revolve transversely with respect to the line of travel of the machine, a driving means connected to and driven by a ground wheel and a mechanism through which said driving means may be clutched with and declutched from said hoe, automatically, and with uniform succession.

4. A device of the character described including a framework, ground wheels, a hoe movable transversely with respect to the line of travel of the machine, a driving means connected to and driven by a ground wheel and a manually controlled mechanism through which said driving means may be connected with said hoe, to drive the same, at times selected by the operator.

5. A device of the character described including a framework, ground wheels, a hoe, means for actuating the hoe transversely with respect to the line of travel of the machine, a driving means connected to and driven by a ground wheel, a mechanism in operative connection with the hoe actuating means and arranged to be clutched with the driving means and driven by the same intermittently, means for declutching said mechanism from said driving means, and a manually actuated device through which said hoe actuating means may be connected with said driving means, when said mechanism is declutched from said driving means, and at times selected by the operator.

6. A device of the character described including a framework, ground wheels, a hoe, an actuating means for intermittently driving the hoe transversely with respect to the line of travel of the machine, a driving means connected to and driven by a ground wheel, a mechanism operatively connected with the hoe actuating means, a clutch for connecting said mechanism with said driving means, and for disconnecting the same therefrom, and a manually actuated device through which said hoe actuating means may be connected with said driving means when said mechanism is declutched from said driving means and at times selected by the operator.

7. A device for chopping plants from a row including a framework, ground wheels, a hoe, an actuating means, operating intermittently for driving the hoe transversely with respect to the row, a driving means connected to and driven by a ground wheel, a manually controlled selective device which may be driven by the operator in unison with the travel of the machine, and through which the hoe actuating means may be connected to the driving means and actuated at times selected by the operator.

8. In a device for chopping plants from rows, a pair of hoes, an actuating means for driving the hoes transversely with respect to the row, a driving means, and a manually controlled selective device through which said hoe actuating means may be connected with the driving means to drive the hoes across the row and on opposite sides of the plants selected by the operator.

9. A device for chopping plants from a row, including a framework, ground wheels, a pair of hoes spaced apart, a hoe actuating means, a driving means driven by one of said wheels, and a selective device which may be manually adjusted into a predetermined position relative to a selected plant and which will operate while in said position to effect the connection of the driving means with the hoe actuating means whereby the hoes are driven across the row on opposite sides of the selected plant.

In testimony whereof I have signed my name to this specification in the presence of two subscribing witnesses.

WALTER F. MOTTIER.

Witnesses:
  E. V. HARDWAY,
  WM. A. CATHEY.